United States Patent [19]

Molloy

[11] Patent Number: 4,571,223
[45] Date of Patent: Feb. 18, 1986

[54] AUTOMATIC BELT TENSIONER

[75] Inventor: Edward W. Molloy, Port Clinton, Ohio

[73] Assignee: General Motors Corporation, Detroit, Mich.

[21] Appl. No.: 621,151

[22] Filed: Jun. 15, 1984

[51] Int. Cl.⁴ ............................................. F16H 7/12
[52] U.S. Cl. .................................. 474/133; 474/135; 474/112
[58] Field of Search ............... 474/133, 135, 136, 138, 474/112, 117

[56] References Cited

U.S. PATENT DOCUMENTS

| | | | |
|---|---|---|---|
| 388,729 | 8/1888 | Shive | 474/133 |
| 3,975,965 | 8/1976 | Speer | 474/135 |
| 4,145,934 | 3/1979 | Sragal | 474/135 |
| 4,270,906 | 6/1981 | Kraft et al. | 474/135 |
| 4,299,584 | 11/1981 | Sproul | 474/135 |
| 4,351,636 | 9/1982 | Hager | 474/135 |
| 4,362,525 | 12/1982 | Sproul | 474/117 |

FOREIGN PATENT DOCUMENTS 2102097  1/1983  United Kingdom .

*Primary Examiner*—James A. Leppink
*Assistant Examiner*—Frank McKenzie
*Attorney, Agent, or Firm*—Patrick M. Griffin

[57] ABSTRACT

An automatic belt tensioner of the type including a pivoted arm and belt engaging pulley includes an improved tensioning means to maintain a constant tension on a drive belt. A cam having an eccentric portion is wrapped and stretched by an elastomer strap. As the strap stretches, the point of tangency of the wrapped strap varies continuously to vary the effective moment arm of the tensioned strap on the cam, which is rigid to the pivoted arm. The strap tension, and the effective moment arm given by the radius of the point of tangency, are matched at each point to give a constant torque and belt tension.

3 Claims, 5 Drawing Figures

AUTOMATIC BELT TENSIONER

This invention relates to belt tensioners in general and specifically to an automatic belt tensioner of the type in which a belt-engaging pulley is continuously and yieldably biased against a serpentine accessory drive belt to maintain a nearly constant tension therein as it stretches throughout the expected life of the belt.

BACKGROUND OF THE INVENTION

There is a growing trend in the automotive industry to use a single drive belt with which to drive all the accessories run from the engine, rather than a series of separate belts and pulleys. There are definite advantages to the single belt use. Perhaps the single most important advantage is increased service life of such drive belts. Additional advantages include weight reduction, reduced parasitic loss, simplified assembly procedures, higher belt stability, and reduced engine length. Such drive belts are wound around a plurality of pulleys on various accessories, and are therefore referred to as "serpentine" drive belts. The main cause of serpentine drive belt failure is material degradation due to heat caused by belt-slip which slip is, in turn, due to insufficient tension on the belt. This insufficient tension arises from the fact that a single, longer belt is subject to greater stretch or lengthening over its expected use life. This stretch is generally compensated for by an automatic belt tensioner.

Automatic tensioners, in general, comprise an arm with a belt-engaging pulley pivoted to one end thereof and with another end pivoted to the engine block. A yieldable tensioning means maintains a tension on the arm in the direction of belt stretch so that the pulley is continuously and yieldably engaged into the belt to move therewith as the belt stretches. It is desirable that such a yieldable tensioning means maintain a continuous or constant tension on the belt. In addition, the belt is sometimes subject to excessive oscillations or belt "rumble" which may arise from a high air conditioning compressor discharge pressure. It is desirable that the automatic tensioner have a means for damping oscillations induced by the belt on the tensioner arm.

There are several types of automatic belt tensioners which find reflection in patents. One common type of tensioner uses, as the tensioning means, a coil spring wound generally concentrically about the axis at which the arm of the tensioner is pivoted to the engine block, as seen in United Kingdom patent application GB No. 2,102,097A. The coil spring is twisted more tightly when the tensioner is in the minimum take-up position with the belt at its shortest length. The spring unwinds and decreases in tension as the arm rotates and the pulley moves with the belt to the maximum take-up position. There is no way to change the effective point of the application of the coil spring force on the tensioner arm as it moves, and it is consequently difficult to maintain a constant torque about the pivot axis.

Another automatic belt tensioner, shown in U.S. Pat. No. No. 4,351,636, to Hagger uses a straight coil spring which is initially arched, and then straightens as it is squeezed between two abutment members which either approach or move apart from each other as the tensioner arm moves back and forth with the belt. The arching and straightening of the spring are purported to change the spring rate to thereby maintain a constant belt tension. Separate vibration damping pads are provided for belt oscillation damping.

The U.S. Pat. No. 4,270,906, to Kraft et al. uses a stack of Belleville washers which compress a pair of cam plates together to translate the axial force of the Belleville washers into a rotary motion of a tensioner arm. This requires a relatively large axial space to accommodate the Belleville washers and camming plates. No particular structure is disclosed for damping belt oscillations.

SUMMARY OF THE INVENTION

The automatic belt tensioner of the subject invention provides a substantially constant belt tension to a serpentine drive belt with a compact, simple and lightweight structure which can be easily varied for different belt tension requirements, and which also provides a means of damping drive belt oscillations without additional structure.

In the preferred embodiment, the tensioner includes an arm pivoted at one end to a bracket affixed to the engine block with a belt-engaging pulley pivoted to the other end and biased against a serpentine drive belt. The arm and pulley swing about the pivot axis between first and second limit positions determined by the longest and shortest lengths of the belt. The length of the arm, the size of the pulley, and the total arc of movement thereof between the limit positions, are conventional and determined by belt parameters generally outside the control of the designer of the belt tensioner. The invention provides an improved tensioning means which acts between the fixed body of the engine block and the pivoted arm to rotationally bias the arm about its pivot axis. A constant belt tension is maintained by maintaining a substantially constant torque on the arm about its pivot axis.

The improved tensioning means of the invention includes a cam which is rigid with respect to the arm and rotates therewith about the pivot axis. The cam has a cam surface defined about the pivot axis which has an eccentric portion. The eccentric portion has a radius, measured relative to the pivot axis, that varies continuously from a longer first radius to a shorter second radius. A resilient strap has a first end joined to the bracket that mounts the tensioner to the engine block and a second end affixed to the cam at a point outside of the eccentric portion. The strap is oriented such that it will be stretched by the cam and will wrap the eccentric portion thereof as the tensioner arm moves between the first and second limit positions.

Thus, the strap is under continuous tension, a tension which increases in the direction of shortest drive belt length and decreases in the direction of longest drive belt length. The point of tangency where the strap leaves the eccentric portion varies continuously between the first and second radius of the eccentric portion as the tensioner arm moves between the first and second limit positions. The torque about the pivot axis is maintained constant by choosing the varying radii of the eccentric portion of the cam surface to create an effective moment arm of the tensioned strap so as to assure substantially constant torque about the pivot axis at each position of the tensioner.

The structure provides additional advantages as well. The strap may be joined to the cam so as to wrap a longer, curved portion of the cam surface integral with the eccentric portion. This ensures that the stretch of the strap will be distributed over the entire strap length to help assure that the strap stretches within its elastic limitation. In addition, the sliding frictional engagement of the resilient strap with the cam surface may be chosen so as to provide a damping effect to compensate for undesirable drive belt oscillations, without providing any extra structure. The tensioner is compact and has few parts, all of which may be made of relatively lightweight materials, and all of which may be easily varied to provide different elasticities and surface characteristics.

It is, therefore, an object of the invention to provide an automatic belt tensioner to maintain a substantially constant belt tension on a serpentine drive belt with an improved tensioning means including a resilient strap and a cam having an eccentric portion shaped so as to create an effective moment arm of the tensioned strap on the cam and the arm that will provide the torque necessary to maintain a constant belt tension.

It is a further object of the invention to provide such an improved tensioning means for an automatic belt tensioner in which the resilient strap wraps and slides over the cam surface so as to distribute the stretch of the strap over the entire length thereof to maintain the strap within its elastic limits.

It is a still further object of the invention to provide such an improved tensioning means in which the sliding engagement between the resilient strap and the cam surface may be used to damp out oscillations of the tensioned drive belt.

Additional features of the invention include a small number of lightweight parts which may be easily varied to suit different conditions and requirements.

DESCRIPTION OF THE PREFERRED EMBODIMENT

These and other objects and features of the invention will be apparent from the following description and accompanying drawings in which.

Figure 1:
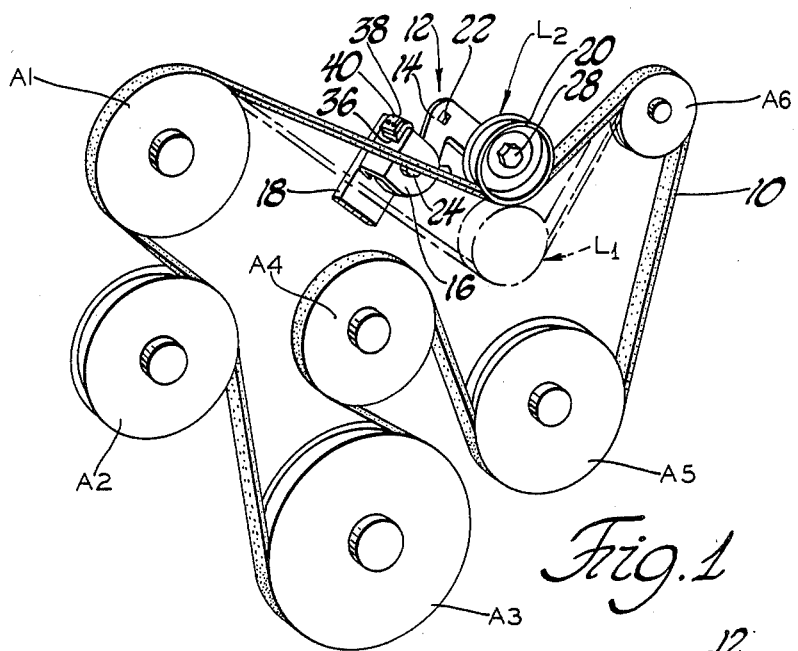
FIG. 1 is a diagrammatic view of a serpentine drive belt driving several accessories and tensioned by the automatic belt tensioner of the invention.

Referring first to FIG. 1, an endless or serpentine drive belt designated generally at 10 is shown wrapped around various accessory pulleys and other drive pulleys designated A1 through A6. Typically, these pulleys are, in relevant order: the air conditioner compresser pulley A1, vacuum pump pulley A2, crankshaft pulley A3, fan and water pump drive pulley A4, power steering pulley A5, and the generator pulley A6. While a single drive belt 10 provides several advantages, as mentioned above, it has the disadvantage of consequently stretching a relatively large amount over its expected use life. Its shortest position is shown in solid lines, its longest, stretched position is shown in dotted lines. These longest and shortest belt positions also define the two limit positions $L_1$ and $L_2$ of the automatic belt tensioner of the invention, designated generally at 12. Additionally, the compressor A1 can cause unwanted oscillations to belt 10 as it operates.

Still referring to FIG. 1, tensioner 12 includes a tensioner arm 14 pivoted at one end at a pivot axis through a bracket designated generally at 16. Bracket 16 is, in turn, joined to a fixed body comprising a portion of the engine block, designated at 18. The other end of tensioner arm 14 includes a belt-engaging pulley 20 pivoted thereto. The lengths of the drive belt 10 and the tension required therein are generally set by engine requirements outside the control of the designer of the tensioner 12. In addition, the size of the belt-engaging pulley 20 is often specified by the manufacturer, and the length of the tensioner arm 14 will be determined by the possible locations where bracket 16 may be attached. Given these parameters, it falls to the designer of the tensioner to provide a tensioning means which will provide the proper drive belt tension.

Figure 2:
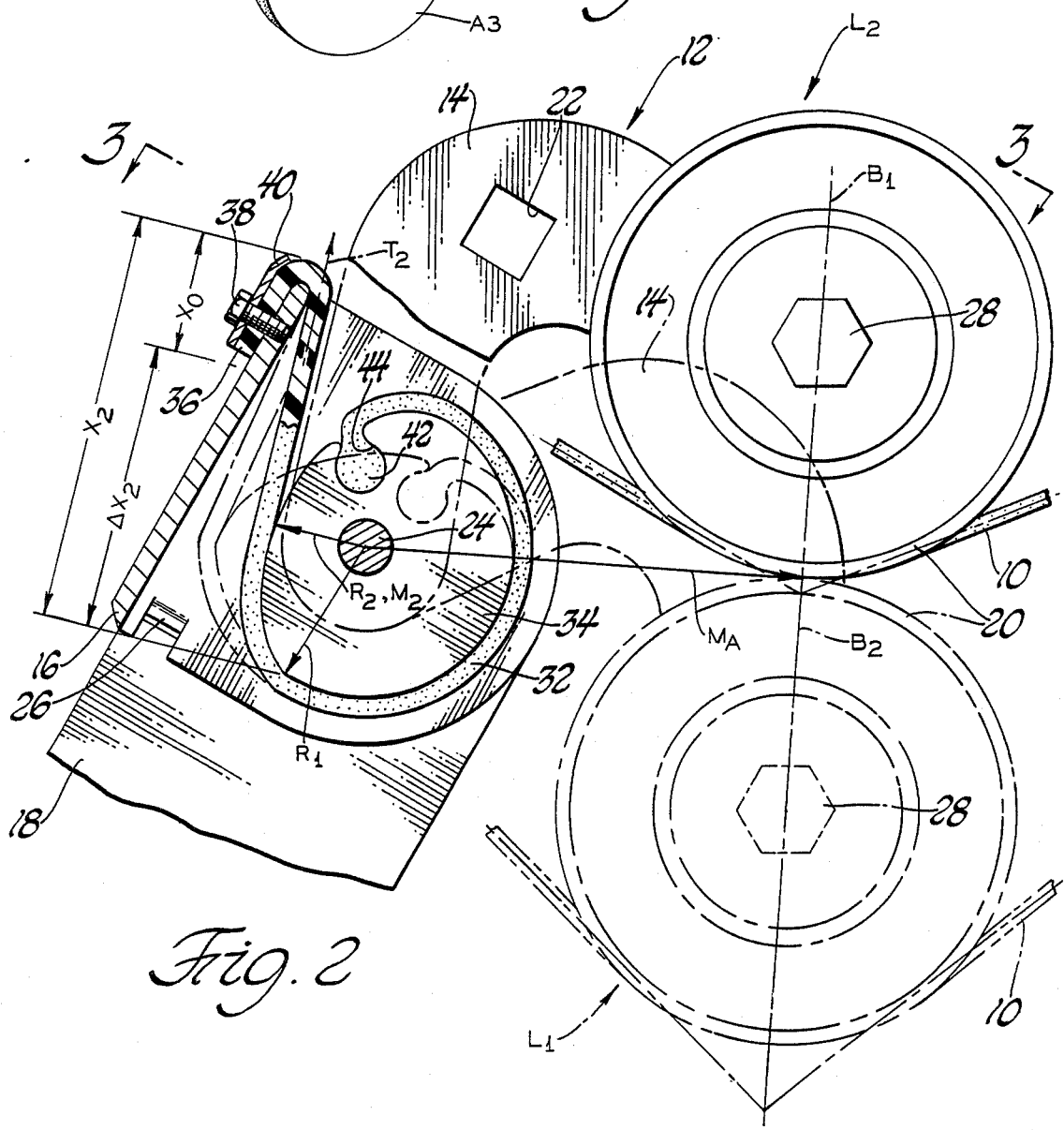
FIG. 2 is an enlarged view of the automatic tensioner of the invention shown in its two limit positions, with a section thereof removed to show the details of the tensioning means.
Figure 3:
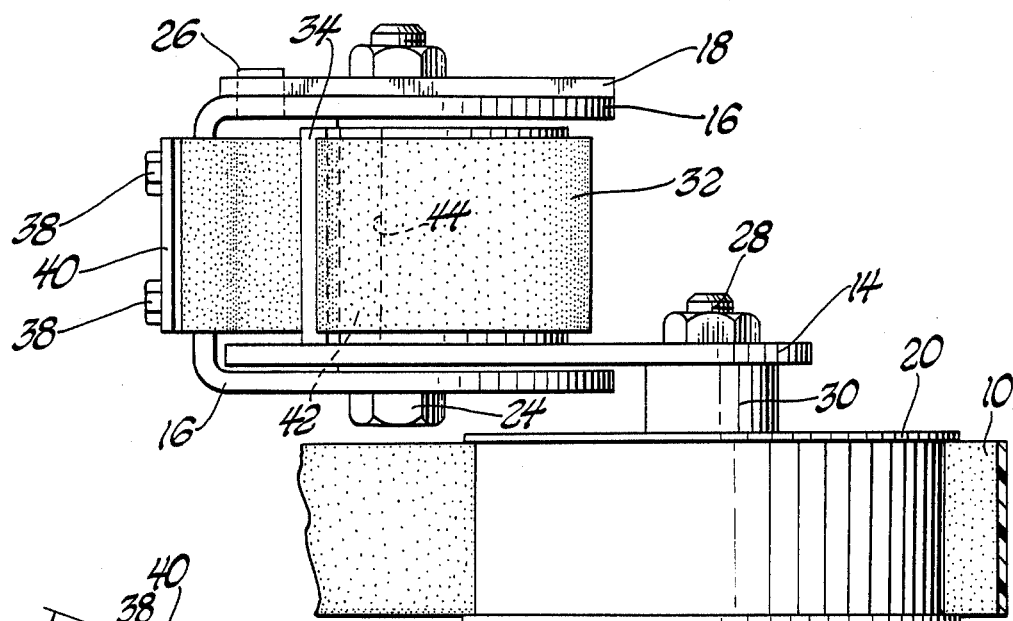
FIG. 3 is a view taken along the line 3—3 of FIG. 2.

Refer now to FIGS. 2 and 3 for details of the elements of automatic belt tensioner 12. Tensioner arm 14 is a metal stamping with a bellcrank lever shape, although any suitable shape may be used. The bell crank shape gives easy access to a central square hole 22 to allow an installation tool to be inserted to pull arm 14 up when belt 10 is being put in place. Bracket 16 is generally clevis-shaped, preferably a metal stamping. Portion 18 of the engine block may be a bracket plate or any other suitable member. In the embodiment shown, bracket 16 is attached to engine block portion 18 by a nut-and-bolt assembly 24 and by a lanced tab 26 which fits through a slot in 18 to hold bracket 16 nonturnably. Nut-and-bolt assembly 24 also provides the pivot axis through bracket 16 for the one end of tensioner arm 14 to allow it to pivot back and forth between its two limit positions. Belt-engaging pulley 20 is attached to the other end of tension arm 14 by nut-and-bolt assembly 28 passing through any suitable bearing (not shown), and spaced from arm 14 by a suitable spacer 30.

Referring to FIG. 2, pulley 20 acts on belt 10, and consequently, belt 10 acts on pulley 20, along the bisector line of the angle of wrap of belt 10 on the pulley 20 at each of the limit positions $L_1$ and $L_2$. The bisector lines are denoted respectively $B_1$ and $B_2$ and are essentially co-linear for the particular limit positions shown. The effective moment arm of tensioner arm 14, as it acts through pulley 20 on belt 10 at each position, is measured along the normal from the centerline of the pivot axis 24 to the bisector. For the limit positions shown, this effective moment arm is the same, and is denoted $M_A$. In the case of a conventional coil spring tensioner that unwinds, it is necessary that this moment arm change in response to the weakening force of the spring. However, the movement of the tensioner arm 14 is basically controlled by the stretch of the drive belt 10, and is out of the purview of the designer of the tensioner. The tensioning means of the invention, however, allows the torque about the pivot axis to be more easily tailored to the otherwise determined movement of the tensiner arm. For the case presented, that torque is maintained essentially constant at each point, but the flexibility exists to make the torque whatever is necessary for belt tensioning.

Still referring to FIG. 2, the tensioning means of the invention is comprised of two basic elements, a resilient elastomer strap 32 and a cam 34. Cam 34, formed of nylon or any other suitable material, is attached nonturnably to arm 14 by the same nut and bolt assembly 24 and rotates therewith about the same pivot axis. Cam 34 includes a cam surface having an eccentric portion with a radius varying continuously between $R_2$ and $R_1$. $R_1$ and $R_2$ are measured relative to the pivot axis of bolt 24, and $R_1$ is longer than $R_2$. $R_1$ corresponds to the L1 limit position and $R_2$ to the L2 limit position, as is described more fully below. The exact shape of cam 34 and the factors determining $R_1$ and $R_2$ may be better understood after describing resilient elastomer strap 32. Strap 32 has a first end 36 joined to the top of bracket 16 by a pair of threaded bolts 38 and a retainer 40. Strap 32 wraps around a part of the eccentric portion and around a longer, curved portion of the cam surface, terminating in a cylindrical or bulbous second end 42 which fits within a matching slot 44 cut into cam 34. The curved portion of the cam surface may be thought of as extending from $R_2$ to slot 44. In the embodiment disclosed, strap 32 is made of any suitable resilient material. The factors governing the modulus of elasticity of strap 32 are discussed later. The cooperation of strap 32 and cam 34, as well as the shape of cam 34, will be next described.

Figure 4:
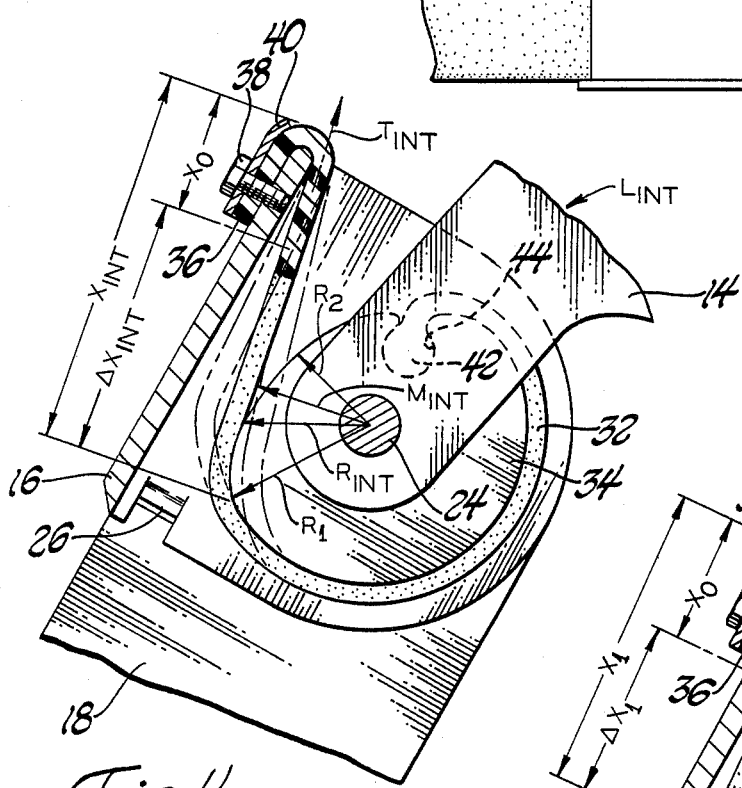
FIG. 4 is a view from the same perspective as FIG. 2 of the tensioning means with the belt tensioner in a position intermediate its two limit positions.
Figure 5:
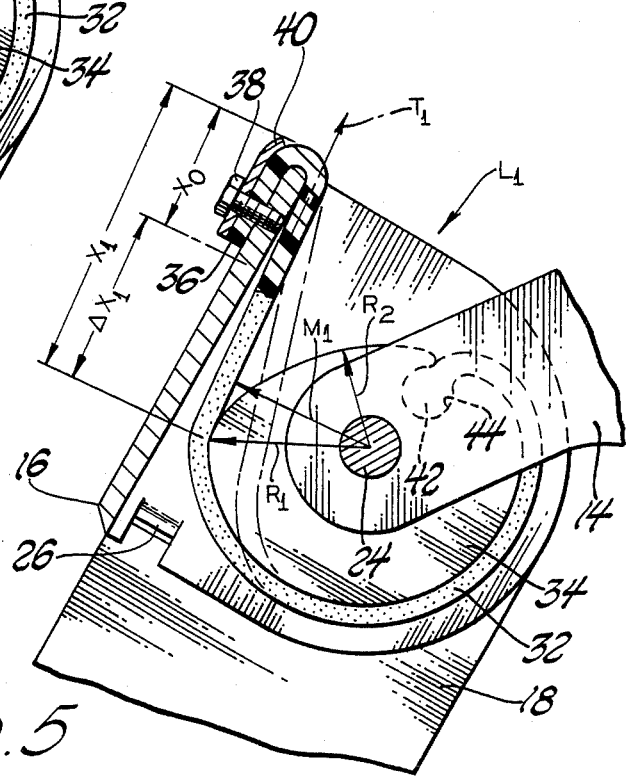
FIG. 5 is a view similar to FIG. 4 showing the tensioning means when the tensioner is in its first limit position.

Strap 32, cam 34, and arm 14 are oriented such that strap 32 is under continuous tension and is under the highest tension when it is in the limit position $L_2$, as seen in FIG. 2, and under the lowest tension at $L_1$ in FIG. 5. Strap 32 is under an intermediate tension at the intermediate position $L_{Int}$, as seen in FIG. 4. The following analysis follows cam 34's motion as it rotates with arm 14, from $L_1$ to $L_2$. In actuality, over the life of the belt, the tensioner moves from the FIG. 2 to the FIG. 5 position as the belt 10 stretches. Also, for ease of analysis, strap 32 will be treated as stretching just between end 36 and the point where radius $R_1$ touches the strap 32. How strap 32 actually stretches will be described later.

In FIG. 5, strap 32 is stretched from the position $X_0$ where the strap 32 is under no tension, to position $X_1$ where it is under a tension $T_1$. The increment of stretch is denoted $\Delta X_1$. Strap 32 leaves the eccentric portion and is tangent thereto at the $R_1$ radius. Referring to FIG. 4, cam 34 has rotated counterclockwise and strap 32 has wrapped more of the eccentric portion. Strap 32 has stretched to a point marked $X_{Int}$ with an increment of stretch marked $\Delta X_{Int}$. This gives an increased strap tension denoted $T_{Int}$. In this position, strap 32 leaves the eccentric portion and is tangent thereto at a radius denoted $R_{Int}$. Referring next to FIG. 2, cam 34 has rotated farther and straap 32 has stretched to a point marked $X_2$, an increment $\Delta X_2$, to give an even greater strap tension denoted $T_2$. In this position, strap 32 has wrapped all of the eccentric portion up to a tangent point at radius $R_2$. The curve of strap 32 about the eccentric portion is ignored for simple analysis.

Referring first to FIG. 5, the basic objectives and limitations in designing cam 34 may be explained. It will be assumed that strap 32 has, as it has stretched, stayed within its elastic limit. The design of cam 34 helps assure this, as discussed below. In each rotated position, the tensioned strap 32 produces a certain force on cam 34, and hence a certain torque about the pivot axis of bolt 24, which will ultimately produce a tension on drive belt 10. It is desired, for the case illustrated, that this torque be constant at each position. The magnitude of that torque at each position will be the product of the strap 32 tension and its effective moment arm at that position. That effective moment arm is the normal distance from the pivot axis of bolt 24 to the line of force of the tensioned strap 32, marked $M_1$ in FIG. 5. The purpose of the radius $R_1$ is to give an angle of orientation to the line of force $T_1$ such that the moment arm $M_1$ for that given stretch and tension of strap 32 gives the desired magnitude of torque, $(M_1 \times T_1)$.

The amount of room available between the pivot axis of bolt 24 and bracket 16 will be somewhat limited and, therefore, the size and potential greatest radius of the eccentric portion of cam 34 will be likewise limited. $R_1$, as shown, is nearly the maximum radius that could be provided for the eccentric portion without rubbing on bracket 16. Therefore, $M_1$ is nearly the greatest effective moment arm available. The designer will likely want to utilize this near maximun. The maximum $M_1$, of course, would occur with $R_1$ normal to the line of force of $T_1$. This is not done, so that if belt 10 stretches farther, rotating arm 14 beyond the $L_1$ position, the moment arm $M_1$ may still increase a bit.

Next, a strap 32 will have to be chosen to have a modulus of elasticity such that the increment of stretch $\Delta X_1$ will, in turn, give a tension that will, when multiplied by $M_1$, give sufficient torque about the pivot axis of bolt 24, to tension the belt 10. The $T_1$ tension will be $K \times \Delta X_1$, or $K \times 1.2''$. $M_1$ is $1.0''$, so the torque ould be $K \times 1.2'' \times 1.0''$. No value is given for K, as the necessary modulus of elasticity will vary in every specific case, but the general design parameters are explained sufficiently that the invention may be applied in each particular situation. No value is given for $R_1$, since it's the effective moment arm $M_1$ which is most significant. It will be noted that changing $R_1$ and, consequently, $M_1$ will not change the amount of stretch $\Delta X_1$ a great deal. This allows the designer to work in successive approximations and gives the flexibility to vary the effective torque substantially by changing the shape of cam 34.

Having chosen a strap 32 elasticity which gives the desired tension at the FIG. 5 limit position, it is necessary that the shape of cam 34 be designed to keep the torque constant as the strap 32 stretches. Referring to FIG. 4, this will be true at the intermediate position if $T_{Int} \times M_{Int} = T_1 \times M_1$. This is equivalent to $K \times \Delta X_{Int} \times M_{Int} = K \times \Delta X_1 \times M_1$, giving the ratio $\Delta X_1 / \Delta X_{Int} = M_{Int}/M_1$. In the FIG. 4 position, $\Delta X_{Int} = 1.7''$ and $R_{Int}$ gives an effective $M_{Int}$ of $0.7''$. $\Delta X_1 / \Delta X_{Int} = 1.2''/1.7''$. And, $M_{Int}/M_1 = 0.7''/1.0''$, both equal to 0.7. So the ratio holds. Again, $R_{Int}$ may be varied to in turn vary $M_{Int}$ without varying $\Delta X_{Int}$ a great deal, so the flexibility exists to easily tailor the shape of cam 34 as desired. No value for $R_{Int}$ is given, either, since it is $M_{Int}$ that is most significant.

Referring to FIG. 2, the limit position of shortest drive belt 10 length, the equivalent ratio must hold, that is, $\Delta X_1 \Delta X_2 = M_2/M_1$. In this position, $R_2$ is the same as $M_2$, approximately $0.6''$. Ignoring the curve of strap 32, $\Delta X_2 = 2.0''$. So $\Delta X_1/\Delta X_2 = 1.2''/2.0''$, and $M_2/M_1 = 0.6''/1.0''$ and the ratio again holds, both equal to 0.6. If the curve of strap 32 were such that strap 32 were stretched too much, the $R_2$ radius could be decreased. It will be understood that should it be desired to provide a torque other than a constant torque, then the cam 34 could also be changed to give a varying torque. This would still be done by matching effective moment arms to various strap tensions, as shown.

The structure of the invention also provides additional advantages. Strap 32 does not stretch as was assumed in the analysis, but stretches over its entire length all the way to end 42. This is because strap 32 can slide sufficiently over the whole wrapped surface of cam 34, both the eccentric and curved portion, to allow it to stretch uniformly. This helps guarantee that strap 32 stays within its limits of elasticity. Another advantage may be provided by the same structure in that the sliding frictional engagement between strap 32 and the wrapped surface of cam 34 may be used to provide a damping effect. Oscillations in drive belt 10 will tend to vibrate tensioner arm 14 and cam 34, causing the wrapped surface of cam 34 to slide back and forth slightly relative to strap 32. The coefficient of friction of the wrapped surface of cam 34 can be chosen to provide a frictional engagement with strap 32 great enough to provide damping, but small enough to allow sufficiently free sliding as the strap 32 stretches. No particular values are given, as they will vary with each case.

In addition, it will be recognized that all the parameters, such as the modulus of elasticity of the strap 32, the shape of cam 34, the coefficient of friction of the wrapped surface of cam 34, may all be easily varied within the same available spaces and volumes, making for an extremely flexible design. The materials are inherently of a lighter weight than are metal springs and other metal parts. It will be understood, therefore, that the invention may be easily incorporated into other embodiments and is not intended to be limited to that disclosed.

The embodiments of the invention in which an exclusive property or privilege is claimed are defined as follows:

1. In an automatic belt tensioning device of the type having a belt engaging pulley on an arm pivoted to a fixed body to rotate about an axis between first and second limit positions determined respectively by the longest and shortest expected normal life length of a belt engaged by the pulley, an improved tensioning means acting between the fixed body and the arm to produce that torque on the arm about its pivot axis that will maintain a substantially constant tension on the belt throughout its normal life as the arm moves between the limit positions, comprising:
  a cam rigid with respect to the arm and rotatable therewith and having a cam surface defined about said arm pivot axis with an eccentric portion having a radius varying continuously relative to said axis between a longer first radius and a shorter second radius,
  and a resilient strap having a first end joined to the fixed body and a second end affixed with respect to said cam outside its eccentric portion, the strap being stretched within its elastic limit to cause a continuously increasing tension on the strap as the arm swings from its first to second limit position, the rotating of the arm causing the strap to wrap the eccentric portion of the cam surface in a manner to move the point of tangency of the strap continuously from the first radius to the second radius to thereby create a varying effective moment arm of the strap tension relative to the pivot axis,
  whereby the torque induced by strap tension on the cam and arm at each point of the rotation may be controlled by predetermining the tangency point radius to give the necessary effective moment arm for each value of the strap tension so that the product thereof will give the torque necessary about the pivot axis on the cam and arm to thereby maintain the belt under a substantially constant tension.

2. In an automatic belt tensioning device of the type having a belt engaging pulley on an arm pivoted to a fixed body to rotate about an axis between first and second limit positions determined respectively by the longest and shortest expected normal lift length of a belt engaged by the pulley, an improved tensioning means acting between the fixed body and the arm to produce that torque on the arm about its pivot axis that will maintain a substantially constant tension on the belt throughout its normal lift as the arm moves between the limit positions, comprising:
  a cam rigid with respect to the arm and rotatable therewith and having a cam surface defined about said arm pivot axis with an eccentric portion having a radius varying continuously relative to said axis between a longer first radius and a shorter second radius, the cam surface also including a curved portion integral with the eccentric portion,
  and a resilient strap having a first end joined to the fixed body and a second end affixed with respect to said cam outside its curved portion, the strap being stretched to cause a continuously increasing tension on the strap as the arm swings from its first to second limit position, the rotating of the arm causing the strap to wrap the curved portion and eccentric portion of the cam surface in a manner to move the point of tangency of the strap with the eccentric portion continuously from the first radius to the second radius to thereby create a varying effective moment arm of the strap tension relative to the pivot axis, the strap sliding sufficiently over the wrapped cam surfaces to distribute the stretch of the strap over its entire length to keep the strap within its elastic limit as it stretches,
  whereby the torque induced by strap tension on the cam and arm at each point of the rotation may be controlled by predetermining the tangency point radius to give the necessary effective moment arm for each value of the strap tension so that the product thereof will give the torque necessary about the pivot axis on the cam and arm to thereby maintain the belt under a substantially constant tension.

3. In an automatic belt tensioning device of the type having a belt engaging pulley on an arm pivoted to a fixed body to rotate about an axis between first and second limit positions determined respectively by the longest and shortest expected normal life length of a belt engaged by the pulley, said tensioner arm also being subject to oscillations from the drive belt, an improved tensioning means acting between the fixed body and the arm to produce that torque on the arm about its pivot axis that will maintain a substantially constant tension on the belt throughout its normal life as the arm moves between the limit positions, as well as acting to dampen the belt oscillations, comprising:
  a cam rigid with respect to the arm and rotatable therewith and having a cam surface defined about said arm pivot axis with an eccentric portion having a radius varying continuously relative to said axis between a longer first radius and a shorter second radius, the cam surface also including a curved portion integral with the eccentric portion,
  and a resilient strap having a first end joined to the fixed body and a second end affixed with respect to said cam outside its curved portion, the strap being stretched to cause a continuously increasing tension on the strap as the arm swings from its first to second limit position, the rotating of the arm causing the strap to wrap the curved portion and eccentric portion of the cam surface in a manner to move the point of tangency of the strap with the eccentric portion continuously from the first radius to the second radius to thereby create a varying effective moment arm of the strap tension relative to the pivot axis, the sliding frictional engagement of the strap with the wrapped cam surface being great enough to dampen oscillations from the drive belt, but small enough to provide free sliding of the strap as it stretches to distribute the stretch over the entire length of the strap to maintain it within its elastic limit, whereby the torque induced by strap tension on the cam and arm at each point of the rotation may be controlled by predetermining the tangency point radius to give the necessary effective moment arm for each value of the strap tension so that the product thereof will give the torque necessary about the pivot axis on the cam and arm to thereby maintain the belt under a substantially constant tension.

* * * * *